(12) United States Patent  (10) Patent No.: US 9,317,312 B2
Kondo et al.  (45) Date of Patent: Apr. 19, 2016

(54) COMPUTER AND MEMORY MANAGEMENT METHOD (71) Applicant: HITACHI, LTD., Tokyo (JP)

(72) Inventors: Nobukazu Kondo, Tokyo (JP); Yusuke Fukumura, Tokyo (JP)

(73) Assignee: HITACH, LTD, Tokyo (JP)

( * ) Notice: Subject to any disclaimer, the term of this patent is extended or adjusted under 35 U.S.C. 154(b) by 68 days.

(21) Appl. No.: 14/190,149

(22) Filed: Feb. 26, 2014

(65) Prior Publication Data

US 2014/0250286 A1 Sep. 4, 2014

(30) Foreign Application Priority Data

Mar. 4, 2013 (JP) .................................. 2013-041601

(51) Int. Cl.
*G06F 3/06* (2006.01)
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/5016* (2013.01); *G06F 2009/45583* (2013.01)

(58) Field of Classification Search
None
See application file for complete search history.

(56) References Cited

U.S. PATENT DOCUMENTS

| 5,696,926 A * | 12/1997 | Culbert et al. ................. 711/203 |
| 5,941,973 A | 8/1999 | Kondo et al. |
| 2008/0025706 A1 | 1/2008 | Yoshida et al. |
| 2008/0183918 A1 | 7/2008 | Dhokia et al. |
| 2010/0252931 A1 | 10/2010 | Lin et al. |
| 2011/0145486 A1 | 6/2011 | Owa et al. |
| 2014/0032818 A1 * | 1/2014 | Chang et al. ................. 711/103 |

FOREIGN PATENT DOCUMENTS

| JP | 11-272605 A | 10/1999 |
| JP | 2008-027383 A | 2/2008 |

* cited by examiner

*Primary Examiner* — Idriss N Alrobaye
*Assistant Examiner* — Dayton Lewis-Taylor
(74) *Attorney, Agent, or Firm* — Mattingly & Malur, P.C.

(57) ABSTRACT

A computer comprising: a processor; a memory; and an I/O device, the memory including at least one first memory element and at least one second memory element, wherein a memory area provided by the at least one second memory element includes a data storage area and a data compression area, wherein the computer comprises a virtualization management unit, and wherein the virtualization management unit is configured to: set a working set for storing data required for processing performed by a virtual machine in generating the virtual machine, and control data stored in the working set in such a manner that part of the data stored in the working set is stored in the data compression area based on a state of accesses to the data stored in the working set.

6 Claims, 11 Drawing Sheets

COMPUTER AND MEMORY MANAGEMENT METHOD

CLAIM OF PRIORITY

The present application claims priority from Japanese patent application JP 2013-41601 filed on Mar. 4, 2013, the content of which is hereby incorporated by reference into this application.

BACKGROUND OF THE INVENTION

This invention relates to a primary storage device of a computer.

Traditional computer systems are disclosed in JP H11-272605 A, and others. To improve the processing performance of a computer system, it is desirable that all data be stored in the working set of the main memory. However, because of the limited capacity of the main memory, all data to be stored in the working set cannot be stored in the main memory. For this reason, the computer stores part of the data in a storage device and read the part of data from the storage device as necessary. Consequently, the access capability to the storage device is a bottle neck for the processing performance of the computer system.

Some approaches are known to cope with the above-mentioned bottleneck. For example, there is a technique that mounts a DRAM or a flash memory within a storage device to perform caching or tiering. You may refer to the paragraph 0019 of JP 2008-27383 A. There is another technique that uses a recently emerging flash memory device connectable to a PCIe bus to improve the performance. You may refer to the paragraph 0029 of US 2010/0252931 A.

SUMMARY OF THE INVENTION

The flash memory devices connectable to PCIe buses, however, are also limited in capacity; all data cannot be stored in the working set. Accordingly, it is required to add a high-speed main memory for the working set to be resident in the main memory. Furthermore, another problem exists that the transfer rate of the PCIe bus will be a bottle neck.

In the meanwhile, if the entire working set can be resident in a DRAM or a flash memory mounted inside the hard disk device, the band width of the Fibre channel, which is the interface connecting the computer with the hard disk device, will be a bottle neck. Consequently, yet another problem arises that the processing performance of the computer cannot be improved to higher than a certain level.

To cope with this problem, an approach can be considered that adds a main memory to allow the entire working set to be resident in the main memory. However, there is a problem that the main memory elevates the cost of the system since a main memory is more expensive than a hard disk or a flash memory. In addition, there is another problem that the addition of a main memory increases the power consumption.

An object of this invention is to improve the processing performance of a computer system in consideration of the cost and power consumption.

The present invention can be appreciated by the description which follows in conjunction with the following figures, wherein: A computer comprises a processor, a memory coupled to the processor, and an I/O device coupled to the processor. The memory includes a first memory element and a second memory element different from the first memory element in characteristics. A memory area provided by the second memory element includes a data storage area and a data compression area. The computer further comprises a virtualization management unit for managing at least one virtual machine allocated computer resources of the computer. The virtualization management unit is configured to: define a working set for storing data required for processing performed by a virtual machine in generating the virtual machine, and control data stored in the working set in such a manner that part of the data stored in the working set is stored in the data compression area based on a state of accesses to the data stored in the working set.

This invention improves the processing performance by the working set resident in a memory area having a high-speed bandwidth. In addition, data is stored in a compressed area depending on the condition of access to the data, so that the entire memory area can be used effectively.

BRIEF DESCRIPTION OF THE DRAWINGS

The present invention can be appreciated by the description which follows in conjunction with the following figures, wherein.

DETAILED DESCRIPTION OF THE EMBODIMENTS

Hereinafter, an embodiment of this invention is described with accompanying drawings. It should be noted that the same configurations and information are denoted by the same reference signs.

(Embodiment 1)

Figure 1:
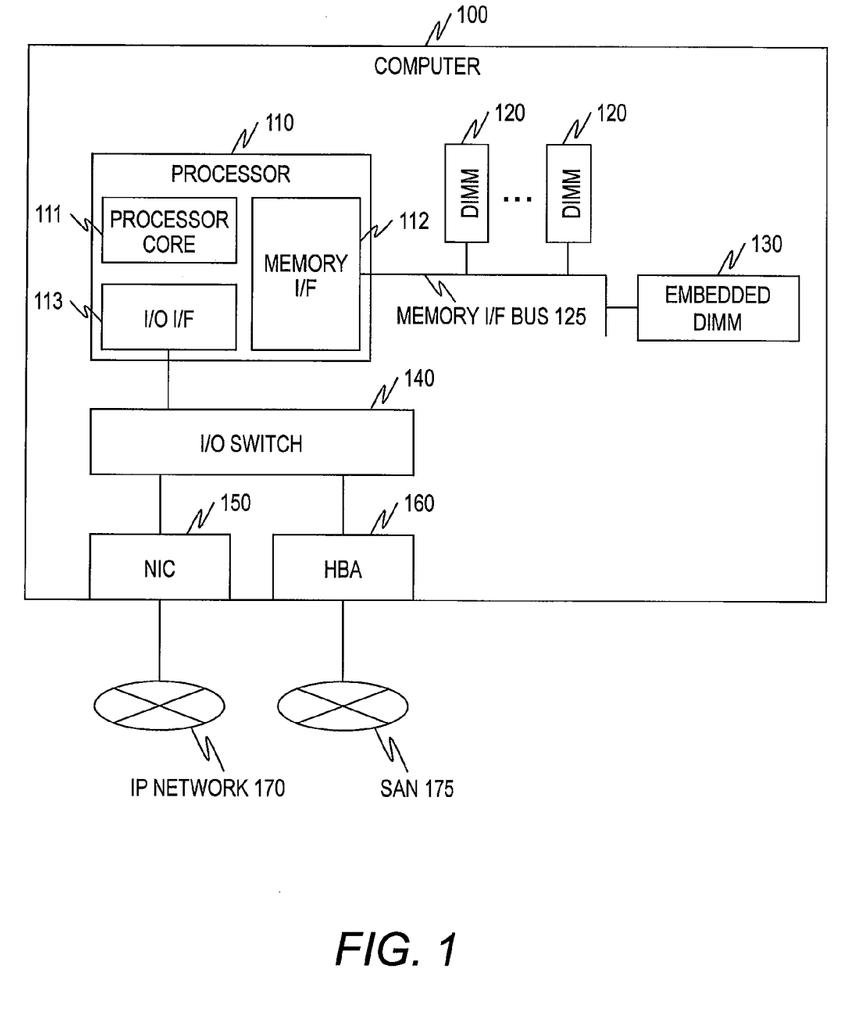
FIG. 1 is a block diagram illustrating a configuration example of a computer according to an embodiment of this invention.

FIG. 1 is a block diagram illustrating a configuration example of a computer according to an embodiment of this invention. FIG. 1 illustrates only one computer but this invention has the same effects on a computer system composed of a plurality of computers.

A computer 100 includes a processor 110, a DIMM 120, an embedded DIMM 130, an I/O switch 140, a NIC 150, and an HBA 160.

The processor 110 executes programs stored in the DIMM 120 or the embedded DIMM 130. The programs are executed by the processor 110 to implement predetermined functions. The processor 110 includes a processor core 111, a memory interface 112, and an I/O interface 113.

The processor core 111 performs computing. The memory interface 112 controls accesses to the memories. The I/O interface 113 controls accesses to the I/O devices.

The DIMM 120 and the embedded DIMM 130 are memories for storing programs to be executed by the processor 110 and information required to execute the programs. The processor 110 accesses the DIMM 120 and the embedded DIMM 130 via the memory interface bus 125. Specifically, the memory interface 112 controls data reads from and data writes to the DIMM 120 and the embedded DIMM 130.

This invention is featured by the embedded DIMM 130 included as a memory. The embedded DIMM 130 is a memory including a plurality of DRAM chips 260 (refer to FIG. 2) and a plurality of flash memory chips 280 (refer to FIG. 2). The details of the embedded DIMM 130 are described later with FIG. 2.

The I/O switch 140 is a switch for connecting with I/O devices. The computer 100 in this embodiment includes a NIC 150 and, an HBA 160 as the I/O devices. The NIC 150 is an interface for connecting with an external device via an IP network 170. The HBA 160 is an interface for connecting with an external device via a SAN 175.

Figure 2:
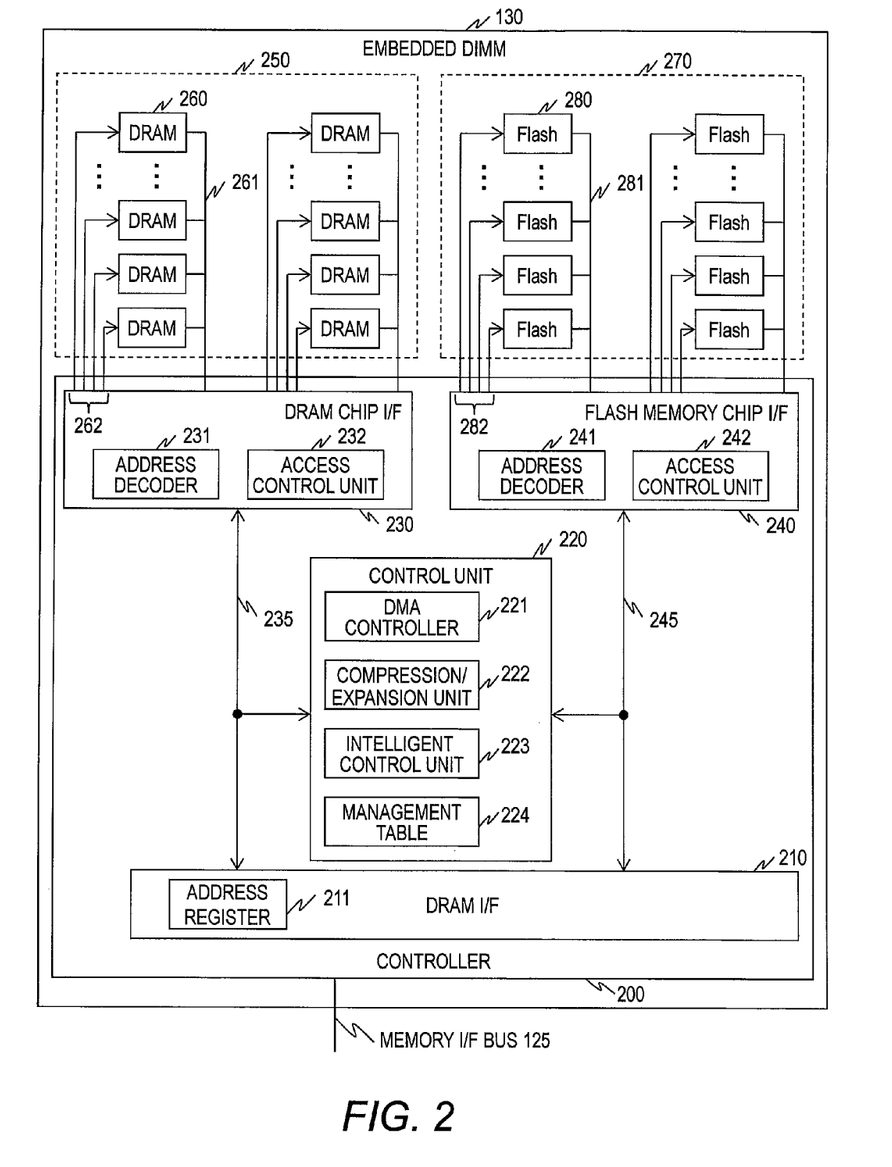
FIG. 2 is a block diagram illustrating a configuration example of an embedded DIMM according to this embodiment.

FIG. 2 is a block diagram illustrating a configuration example of the embedded DIMM 130 according to this embodiment.

The embedded DIMM 130 includes a controller 200, a DRAM-mounted section 250, and a flash memory-mounted section 270.

The DRAM-mounted section 250 includes a plurality of DRAM chips 260. The flash memory-mounted section 270 includes a plurality of flash memory chips 280.

The controller 200 controls accesses to the embedded DIMM 130 via the memory interface bus 125. The controller 200 includes a DRAM interface 210, a control unit 220, a DRAM chip interface 230, and a flash memory chip interface 240. The controller 200 further includes a not-shown buffer.

The DRAM interface 210, the control unit 220, and the DRAM chip interface 230 are interconnected via an internal bus 235. The DRAM interface 210, the control unit 220, and the flash memory chip interface 240 are interconnected via an internal bus 245.

The DRAM interface 210 is an interface for accepting accesses via the memory interface bus 125 and includes an address register 211. The address register 211 is a register for latching memory addresses. The address register 211 may be located outside the DRAM interface 210.

The control unit 220 controls accesses to the embedded DIMM 130. The control unit 220 includes a DMA controller 221, a compression/expansion unit 222, an intelligent control unit 223, and a management table 224.

The DMA controller 221 controls DMA transfers. The compression/expansion unit 222 compresses or expands data. The intelligent control unit 223 controls data reads from and data writes to the DRAM-mounted section 250 and the flash memory-mounted section 270.

The management table 224 includes information required for the intelligent control unit 223 to perform controls. For example, the management table 224 includes information for managing the addresses of the later-described DRAM-mounted area 350 and flash memory-mounted area 360 in physical address space 300.

The DRAM chip interface 230 controls accesses to each of the plurality of DRAM chips 260 in the DRAM-mounted section 250. The DRAM chip interface 230 connects with each of the plurality of DRAM chips 260 via a DRAM bus 261.

The DRAM chip interface 230 includes an address decoder 231 and an access control unit 232. The address decoder 231 identifies a DRAM chip 260 to be accessed from an address and outputs a chip select signal 262 to the identified DRAM chip 260. The access control unit 232 controls accesses to the DRAM chip 260.

The flash memory chip interface 240 controls accesses to each of the plurality of flash memory chips 280 in the flash memory-mounted section 270. The flash memory chip interface 240 connects with each of the plurality of flash memory chips 280 via a flash memory bus 281.

The flash memory chip interface 240 includes an address decoder 241 and an access control unit 242. The address decoder 241 identifies a flash memory chip 280 to be accessed from an address and outputs a chip select signal 282 to the identified flash memory chip 280. The access control unit 242 controls accesses to the plurality of flash memory chips 280.

The embedded DIMM 130 further includes a not-shown SPD (Serial Presence Detect). The SPD stores information such as the type, the capacity, and the operating frequency of the embedded DIMM 130. In this embodiment, the SPD has information about the storage capacity of the DRAM-mounted section 250 and the storage capacity of the flash memory-mounted section 270.

Figure 3A:
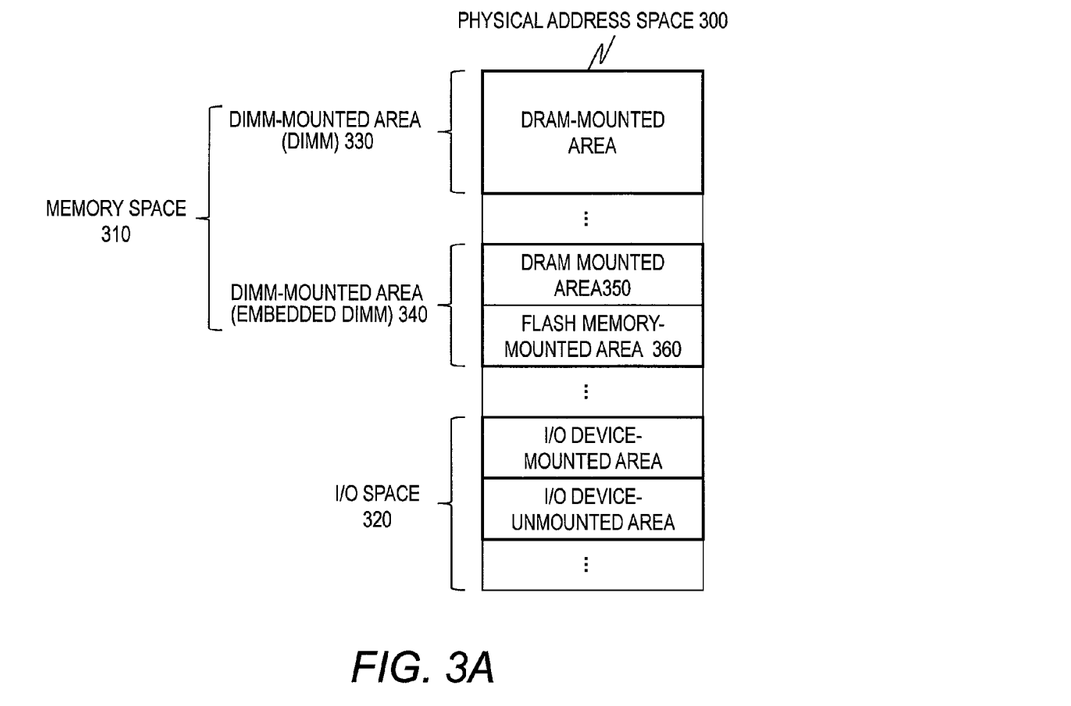
FIGS. 3A and 3B are explanatory diagrams illustrating an example of address space according to this embodiment.
Figure 3B:
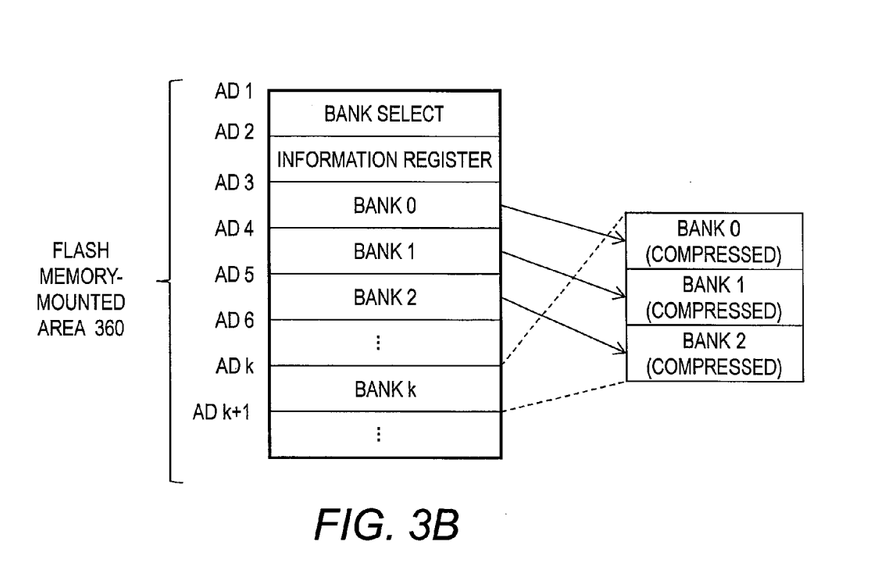

FIGS. 3A and 3B are explanatory diagrams illustrating an example of address space according to this embodiment.

The physical address space 300 includes memory space 310 and I/O space 320. The memory space 310 is an address space used to access the memory. The memory space 310 includes a DIMM-mounted area 330 for the DIMM 120 and a DIMM-mounted area 340 for the embedded DIMM 130. Further, the DIMM-mounted area 340 includes a DRAM-mounted area 350 and a flash memory-mounted area 360.

It should be noted that the memory space 310 further includes a DIMM-unmounted area, which is to be allocated to the DIMMs added to the computer 100 later.

The I/O space 320 is an address space to be used to access the I/O devices. The I/O space 320 includes an I/O device-mounted area and an I/O device-unmounted area. The I/O device-mounted area is an area for storing information for the register for operating the I/O devices included in the computer 100 and others. The I/O device-unmounted area is an area to be allocated to the I/O devices added to the computer 100 later.

As will be described later, the flash memory-mounted area 360 is mapped in I/O space 520 with respect to virtual address space 500 (refer to FIG. 5). In this case, the I/O space 520 is larger than the flash memory-mounted area 360 and the flash memory-mounted area 360 cannot be mapped to the I/O space 520 with one-to-one correspondence. Accordingly, it is preferable that the flash memory-mounted area 360 be managed by bank access system as shown in FIG. 3B.

The flash memory-mounted area 360 in this embodiment is composed of a bank select register, information register, and a plurality of banks.

The bank select register is an area for storing identification information on the plurality of banks. The information register is an area for storing control information on each of the plurality of banks, such as access time of each page.

A bank is a management unit for the flash memory-mounted section 270; for example, one bank is associated with one flash memory chip 280. In this embodiment, the plurality of banks include at least one bank for storing normal data and at least one bank for storing compressed data. In the example shown in FIG. 3B, the bank k stores data obtained by compressing the data stored in the banks 0 to 2.

In the following description, the at least one bank for storing normal data are referred to as flash memory use area and the at least one bank for storing compressed data is referred to as flash memory compression area.

Figure 4:
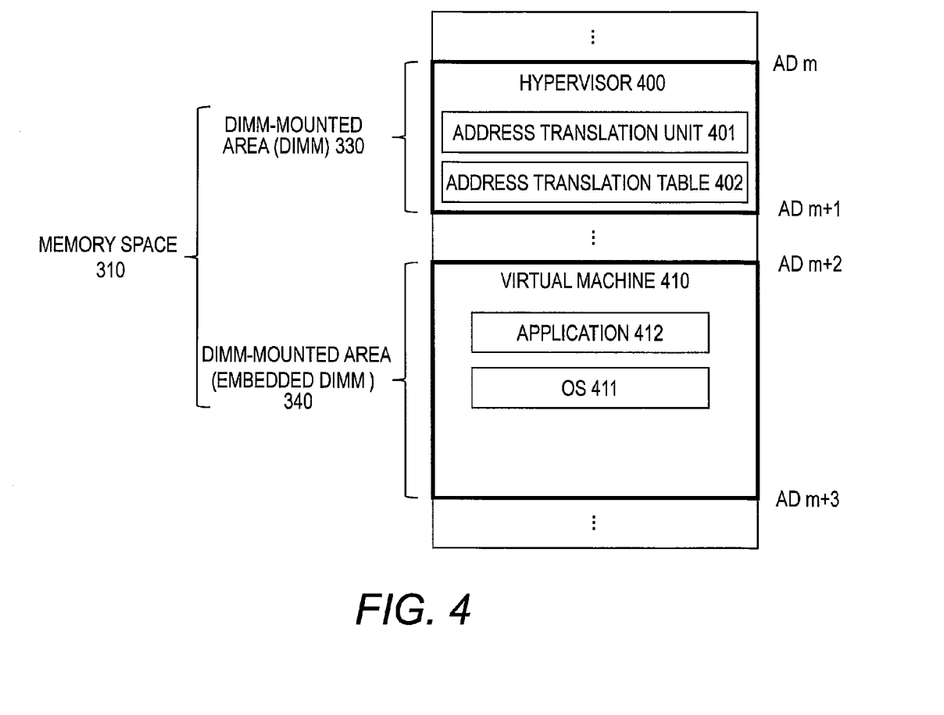
FIG. 4 is an explanatory diagram illustrating an example of a manner of managing software in memory space according to this embodiment.

FIG. 4 is an explanatory diagram illustrating an example of a manner of managing software in the memory space 310 according to this embodiment.

In this embodiment, a hypervisor 400 manages address allocation in the memory space.

In the example shown in FIG. 4, the hypervisor 400 allocates one DIMM-mounted area 330 for its own storage area and allocates one DIMM-mounted area 340 to one virtual machine 410. The hypervisor 400 also allocates virtual address space 500 (refer to FIG. 5) to the virtual machine 410.

It should be noted that the manner of the memory space allocation shown in FIG. 4 is merely an example; a plurality of DIMM-mounted areas 330 or a plurality of DIMM-mounted areas 340 may be allocated to one virtual machine 410. Alternatively, both one or more DIMM-mounted areas 330 and one or more DIMM-mounted areas 340 may be allocated to one virtual machine 410.

The DIMM-mounted area 330 allocated to the hypervisor 400 stores a program for implementing an address translation unit 401 and an address translation table 402. The address translation unit 401 translates addresses between the virtual address space and the physical address space. The address translation table 402 stores correspondence relations between the virtual address space and the physical address space.

The DIMM-mounted area 340 allocated to the virtual machine 410 stores programs for implementing an OS 411 and an application 412. The DIMM-mounted area 340 also includes a working set used by the application 412.

Figure 5:
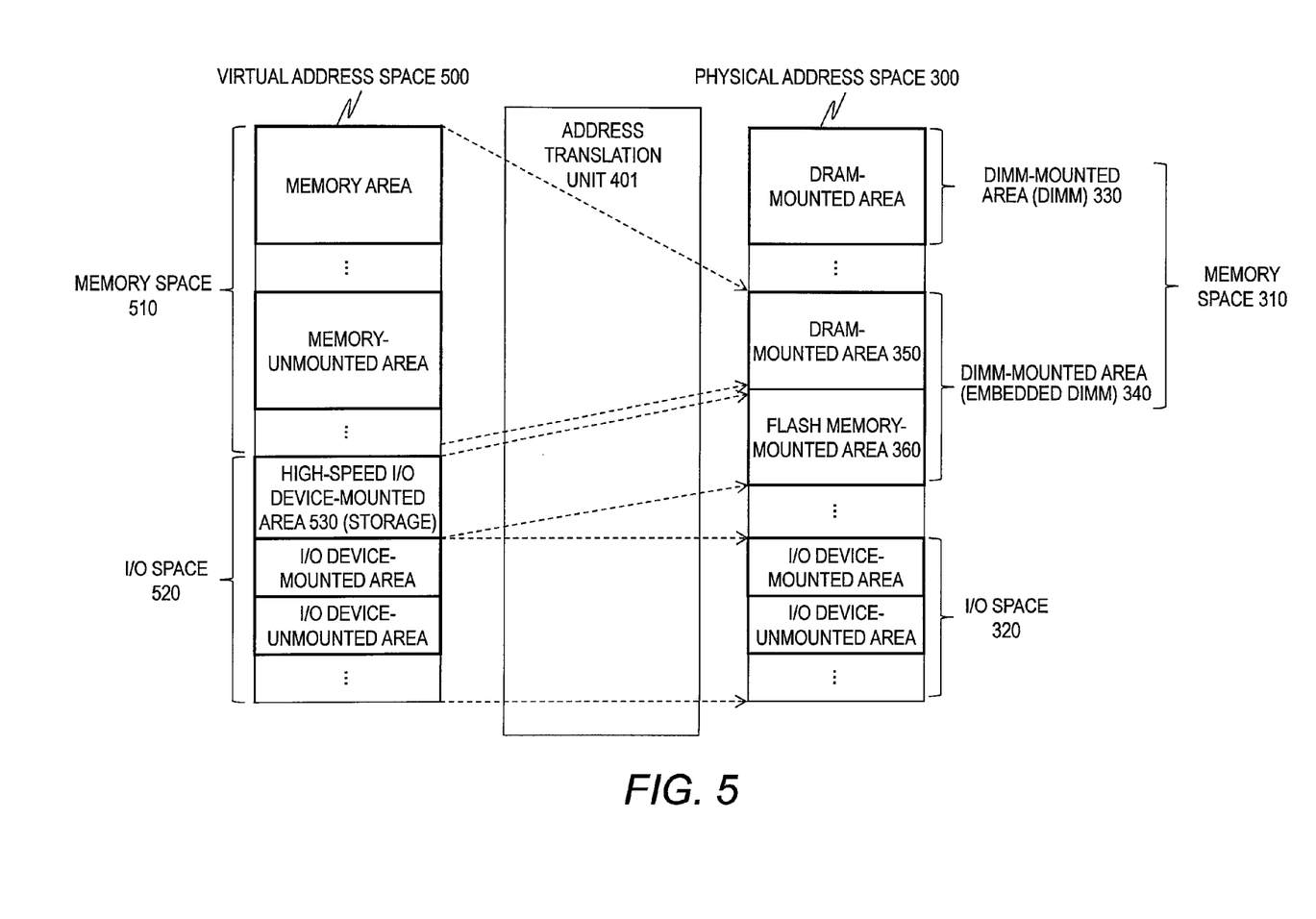
FIG. 5 is an explanatory diagram illustrating correspondence relations between virtual address space and physical address space according to this embodiment.

FIG. 5 is an explanatory diagram illustrating correspondence relations between the virtual address space and the physical address space according to this embodiment.

In this embodiment, the DRAM-mounted area 350 in the DIMM-mounted area 340 is mapped to the memory space 510 in the virtual address space 500 and the flash memory-mounted area 360 is mapped to the I/O space 520 in the virtual address space 500. Specifically, the flash memory-mounted area 360 is mapped to a high-speed I/O device-mounted area 530.

That is to say, the hypervisor 400 allocates the flash memory-mounted section 270 in the embedded DIMM 130 for a virtual storage device.

As a result, the OS 411 operating on the virtual machine 410 can use the flash memory-mounted area 360 as a storage area provided by a virtual storage device. Since the configuration of the embedded DIMM 130 can be concealed from the traditional OS 411, the embedded DIMM 130 can be introduced without reconfiguration of the traditional OS 411.

The address translation unit 401 translates an access to a specific address in the memory space 510 into an access to a specific address in the DRAM-mounted area 350 based on the address translation table 402. The address translation unit 401 further translates an access to a specific address in the high-speed I/O device-mounted area 530 into an access to a specific address in the flash memory-mounted area 360 based on the address translation table 402. Still further, the address translation unit 401 translates an access to a specific address in the I/O device-mounted area other than the high-speed I/O device-mounted area 530 into an access to a specific address in the I/O space 320 based on the address translation table 402.

Figure 6:
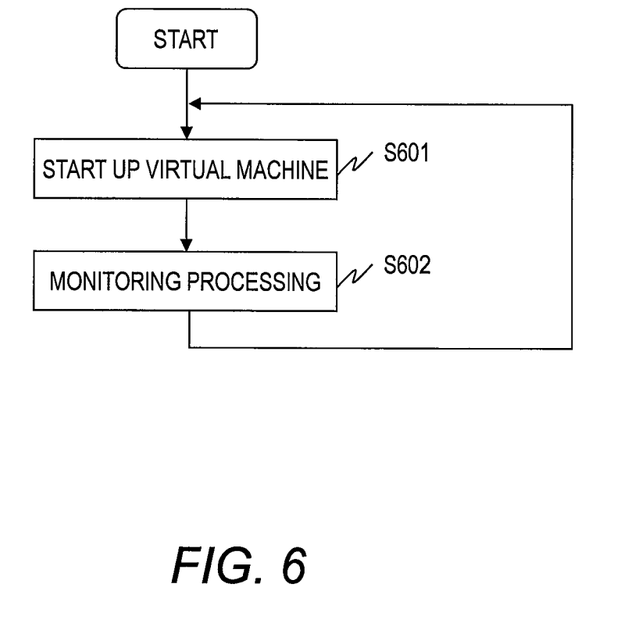
FIG. 6 is a flowchart illustrating processing of a hypervisor according to this embodiment when generating a virtual machine.

FIG. 6 is a flowchart illustrating the processing of the hypervisor 400 according to this embodiment when generating a virtual machine.

The hypervisor 400 starts processing upon receipt of a request to generate a virtual machine 410.

The hypervisor 400 starts up a virtual machine 410 (Step S601). Specifically, the following processing is performed.

The hypervisor 400 allocates computer resources such as a processor 110, a DIMM 120, an embedded DIMM 130, and I/O devices to generate a virtual machine 410. In this embodiment, at least one embedded DIMM 130 is allocated to the virtual machine 410.

On this occasion, the hypervisor 400 allocates the DRAM-mounted area 350 of the embedded DIMM 130 for a virtual memory and allocates the flash memory-mounted area 360 for a virtual disk. Through this processing, the virtual machine 410 is allocated a virtual address space 500 as shown in FIG. 5.

The hypervisor 400 registers the correspondence relations between the high-speed I/O device-mounted area 530 and the flash memory-mounted area 360 in the address translation table 402. The hypervisor 400 further sets a storage area to be allocated to the working set for the virtual machine 410 in the flash memory-mounted area 360.

The hypervisor 400 monitors the DRAM-mounted area 350 and the flash memory use area. The hypervisor 400 further sets an upper limit and a lower limit for the size of free space in each of these storage areas. In the following description, the DRAM-mounted area 350 and the flash memory use area are also referred to as monitored storage area.

As will be described later, the hypervisor 400 accesses the flash memory-mounted area 360 via the memory interface bus 125 in accessing the working set, achieving high-speed access to the working set. This high-speed access improves the throughput of the application operating on the virtual machine 410.

Furthermore, since the flash memory-mounted area 360 can be arranged to have a higher capacity, swapping the working set to an external storage or other storage area can be avoided.

The other computer resources can be allocated using a known technique; the explanation thereof is omitted.

Described above is the processing at Step S601.

After completion of the processing at Step S601, the OS 411 and the application 412 starts operating on the generated virtual machine 410. The processing performed by the application 412 to access a virtual memory or a virtual disk will be described later with FIGS. 8, 9A, and 9B.

Next, the hypervisor 400 performs monitoring processing on the monitored storage area (Step S602). The details of the monitoring processing on the monitored storage area will be described later with FIG. 7.

The monitoring processing may be performed periodically or upon detection of an access to the virtual memory or the virtual disk.

The hypervisor 400 repetitively performs the monitoring processing until closure of the application 412 or deletion of the virtual machine 410.

Figure 7:
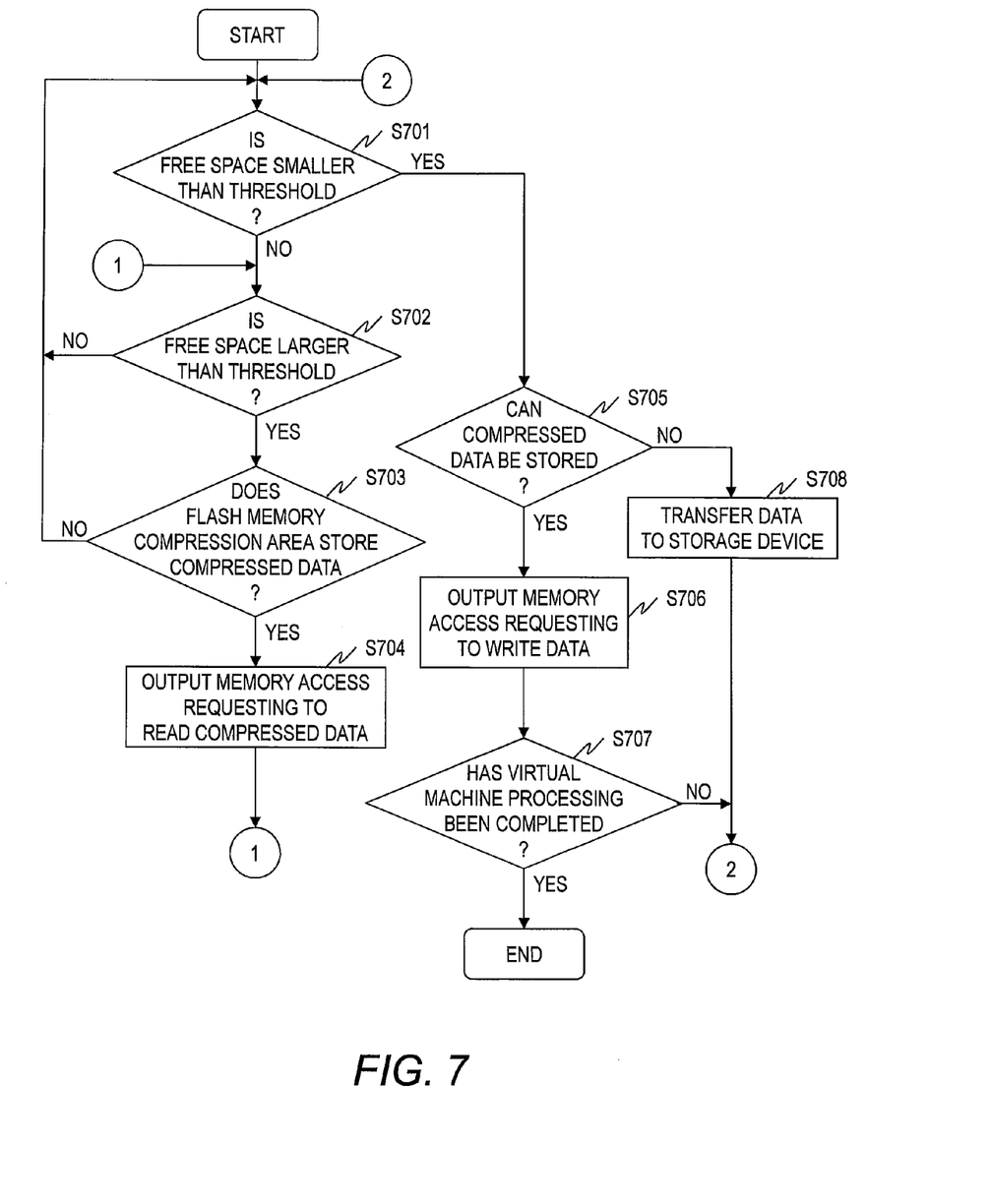
FIG. 7 is a flowchart illustrating monitoring processing on monitored storage area according to this embodiment.

FIG. 7 is a flowchart illustrating the monitoring processing on the monitored storage area according to this embodiment.

The hypervisor 400 determines whether the free space of the monitored storage area is insufficient (Step S701).

Specifically, the hypervisor 400 determines whether the free space of the monitored storage area is smaller than the lower limit. In a case where the free space of the monitored storage areas is smaller than the lower limit, the hypervisor 400 determines that the free space of the monitored storage area is insufficient.

The information on the free space of the monitored storage area can be obtained by a known technique. For example, it can be obtained from the management information on computer resource allocation held in the hypervisor 400. This invention is not limited to this method.

In a case where it is determined that the free space of the monitored storage area is not insufficient, the hypervisor 400 determines whether the monitored storage area has extra free space (Step S702).

Specifically, the hypervisor 400 determines whether the free space of the monitored storage area is larger than the upper limit. In a case where the free space of the monitored storage area is larger than the upper limit, the hypervisor 400 determines that the monitored storage area has extra free space.

In a case where it is determined that the monitored storage area does not have extra free space, meaning that no space to expand compressed data can be secured, the hypervisor 400 returns to Step S701 and repeats the same processing.

In a case where it is determined that the monitored storage area has extra free space, the hypervisor 400 determines whether the flash memory compression area stores any compressed data (Step S703).

Specifically, the hypervisor 400 refers to the flash memory compression area in the flash memory-mounted area 360 allocated to the virtual machine to determine whether it stores any compressed data.

In a case where it is determined that the flash memory compression area stores no compressed data, the hypervisor 400 returns to Step S701 and repeats the same processing.

In a case where it is determined that the flash memory compression area stores compressed data, the hypervisor 400 outputs a memory access requesting to read the compressed data from the flash memory compression area to the flash memory use area (Step S704). Then, the hypervisor 400 returns to Step S702 and repeats the same processing. In the following description, the memory access output at Step S704 is also referred to as first special memory access.

At Step S704, the following processing is performed.

The hypervisor 400 selects at least one bank to read compressed data from the flash memory compression area. For example, a bank storing compressed data having a new access time or a bank storing compressed data having a high access frequency may be selected.

The hypervisor 400 selects at least one bank to store the compressed data from the flash memory use area. For example, one or more banks having their addresses close to the address of the bank to read the compressed data may be selected.

The hypervisor 400 outputs the first special memory access including the address of the at least one bank to read the compressed data and the addresses of the at least one bank to store the expanded data.

Described above is the processing at Step S704.

The processing performed by the embedded DIMM 130 that receives the first special memory access will be described later with FIGS. 9A and 9B.

At Step S701, in a case where it is determined that the free space of the monitored storage areas is insufficient, the hypervisor 400 determines whether the flash memory compression area can store compressed data (Step S705).

Specifically, the hypervisor 400 obtains the size of the free space of the flash memory compression area and determines whether any space to store compressed data is available.

In a case where it is determined that the flash memory compression area can store compressed data, the hypervisor 400 outputs a memory access requesting to write data from the flash memory use area to the flash memory compression area (Step S706). Thereafter, the hypervisor 400 proceeds to Step S707. In the following description, the memory access output at Step S706 is also referred to as second special memory access.

At Step S706, the following processing is performed.

The hypervisor 400 obtains access times of the individual banks with reference to the information register for the flash memory use area. The hypervisor 400 selects at least one bank in order of access time from the oldest to the newest. It should be noted that this invention is not limited in the number of banks to be selected. For example, the number of banks to be selected may be determined in advance; alternatively, the hypervisor 400 may select the number so that the size of the free space will not be smaller than the lower limit.

The hypervisor 400 selects at least one bank in the flash memory compression area. For example, a bank having an address close to the addresses of the banks storing the data to be compressed.

The hypervisor 400 outputs the second special memory access including the addresses of the at least one bank storing the data to be compressed and the address of the at least one bank to store the data.

Described above is the processing at Step S706.

The processing performed by the embedded DIMM 130 that receives the second special memory access will be described later with FIGS. 9A and 9B.

Next, the hypervisor 400 determines whether the processing in the virtual machine 410 has been completed (Step S707). For example, the hypervisor 400 determines whether the processing in the application 412 has been completed.

In a case where it is determined that the processing in the virtual machine 410 has been completed, the hypervisor 400 terminates the processing.

In a case where it is determined that the processing in the virtual machine 410 has not been completed yet, the hypervisor 400 returns to Step S701 and repeats the same processing.

At Step S705, it is determined that the flash memory compression area cannot store compressed data, the hypervisor 400 swaps the data stored in the flash memory use area, or part of the data stored in the working set, to the storage device connected via the I/O switch 140 (Step S708). Thereafter, the hypervisor 400 returns to Step S701 and repeats the same processing.

In this embodiment, the hypervisor 400 selects the data to be swapped through the following processing. The hypervisor 400 checks the access times of the individual banks with reference to the information register for the flash memory use area. The hypervisor 400 selects at least one bank in order of access time from the oldest to the newest. It should be noted that this invention is not limited in the number of banks to be selected. For example, the number of banks to be selected may be determined in advance; alternatively the hypervisor 400 may select the number so that the size of the free space will not be smaller than the lower limit.

Swapping the selected data to the storage device may be performed by a known technique and the details of the processing are omitted from this description.

Next, processing a memory access is described.

Figure 8:
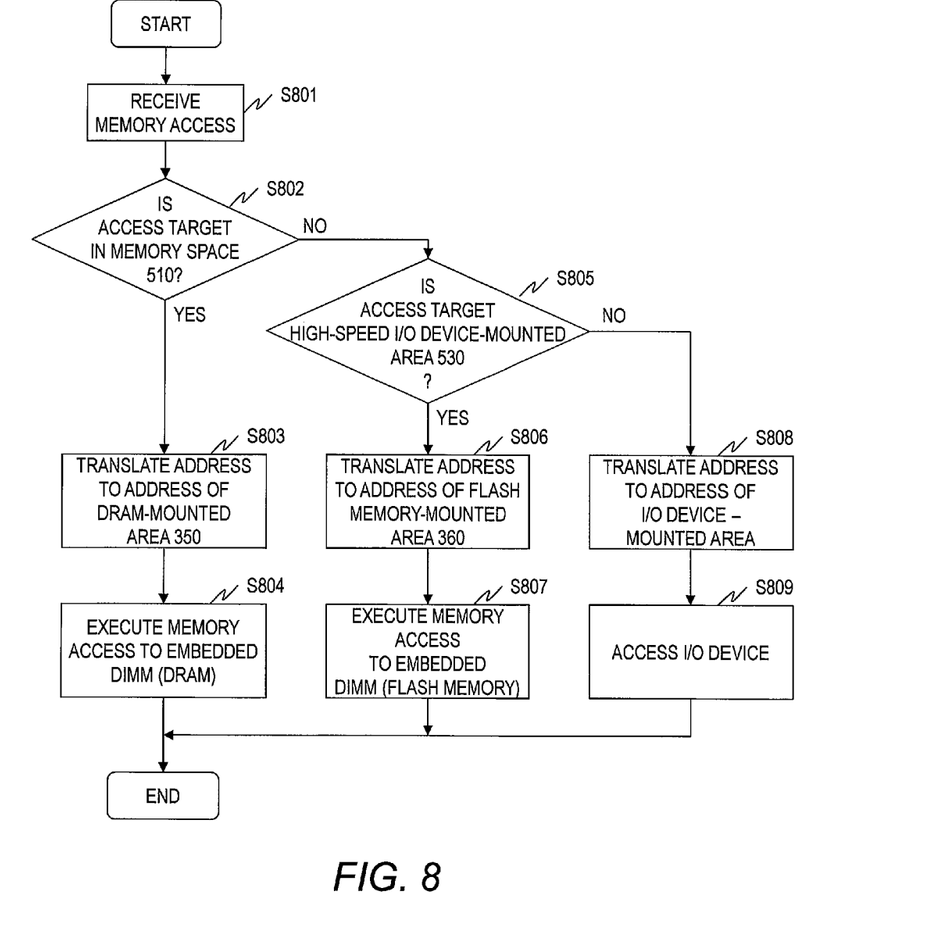
FIG. 8 is a flowchart illustrating processing of the hypervisor according to this embodiment when it receives a memory access.

FIG. 8 is a flowchart illustrating the processing of the hypervisor 400 according to this embodiment when it receives a memory access.

The hypervisor 400 starts the processing upon receipt of a memory access from the OS 411 on the virtual machine 410 (Step S801).

The hypervisor 400 determines whether the access target of the memory access is in the memory space 510 of the virtual address space 500 (Step S802).

Specifically, the hypervisor 400 determines whether the address of the access target is included in the address range allocated to the memory space 510.

In a case where it is determined that the access target is in the memory space 510, the hypervisor 400 translates the address into an address of the DRAM-mounted area 350 in the physical address space 300 with reference to the address translation table 402 (Step S803). Further, the hypervisor 400 executes the memory access to the DRAM-mounted section 250 of the embedded DIMM 130 (Step S804) and terminates the processing.

In a case where it is determined that the access target is not in the memory space 510, the hypervisor 400 determines whether the access target of the memory access is in the high-speed I/O device-mounted area 530 (Step S805).

Specifically, the hypervisor 400 determines whether the address of the access target is included in the address range allocated to the high-speed I/O device-mounted area 530.

In a case where it is determined that the access target is in the high-speed I/O device-mounted area 530, the hypervisor 400 translates the address into an address of the flash memory-mounted area 360 in the physical address space 300 with reference to the address translation table 402 (Step S806). Further, the hypervisor 400 executes the memory access to the flash memory-mounted section 270 in the embedded DIMM 130 (Step S807) and terminates the processing.

At Step S805, In a case where it is determined that the access target is not included in the high-speed I/O device-mounted area 530, the hypervisor 400 translates the address into an address of the I/O device-mounted area in the physical address space 300 with reference to the address translation table 402 (Step S808). Further, the hypervisor 400 accesses the I/O device (Step S809) and terminates the processing.

Figure 9A:
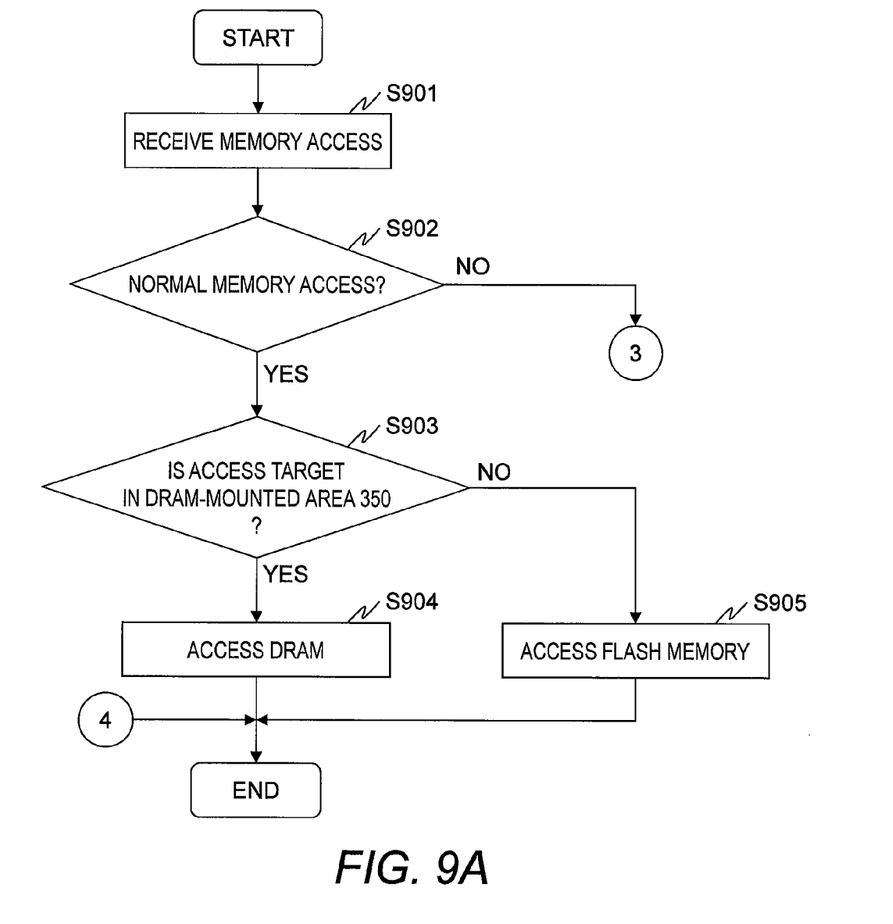
FIGS. 9A and 9B are flowcharts illustrating access processing performed by the embedded DIMM according to this embodiment.
Figure 9B:
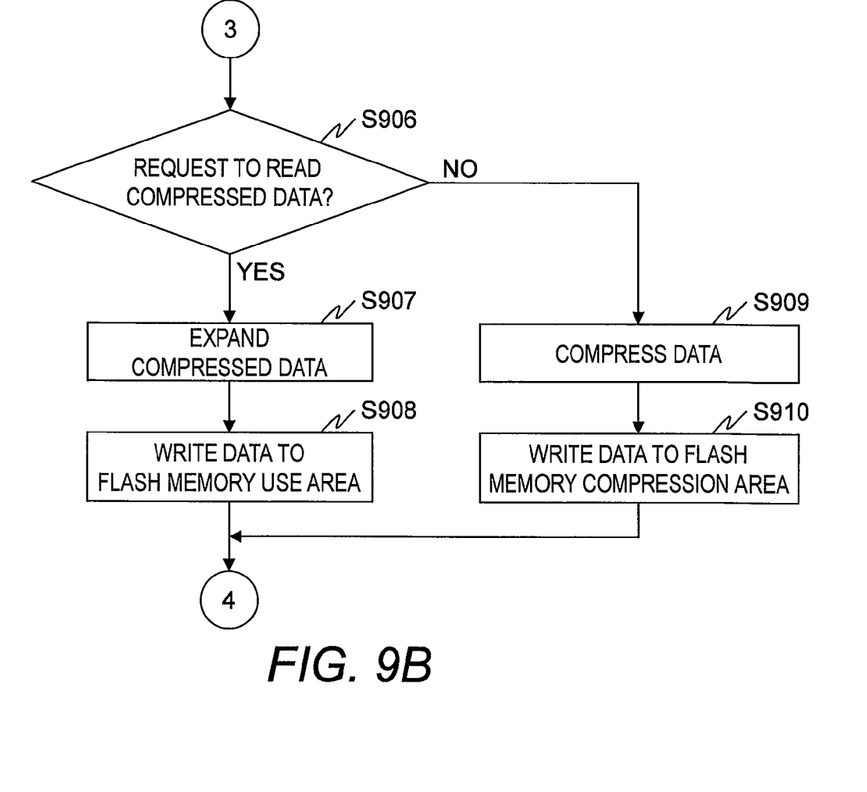

FIGS. 9A and 9B are a flowchart illustrating access processing performed by the embedded DIMM 130 according to this embodiment.

The embedded DIMM 130 starts processing upon receipt of a memory access (Step S901). Specifically, the DRAM interface 210 receives the memory access.

The embedded DIMM 130 determines whether the received memory access is a normal memory access (Step S902).

The normal memory access in this description means an access other than a memory access requesting to read compressed data to the flash memory use area or a memory access requesting to write data to the flash memory compression area.

Specifically, the control unit 220 determines whether the memory access includes two addresses. This is because the foregoing two memory accesses include two addresses in this embodiment. This invention is not limited to this approach and may employ an approach that includes a flag for identifying that the memory access is a normal memory access in the memory access, for example.

In a case where it is determined that the memory access is the normal memory access, the embedded DIMM 130 determines whether the access target is in the DRAM-mounted area 350 (Step S903).

Specifically, the control unit 220 determines whether the address of the access target is included in the address range of the DRAM-mounted area 350 based on the management table 224 and the address included in the received memory access.

In a case where it is determined that the access target is in the DRAM-mounted area 350, the embedded DIMM 130 accesses at least one of the specified DRAM chip 260 via the DRAM bus 261, responds the result of the access to the processor 110, and terminates the processing (Step S904).

Specifically, the DRAM chip interface 230 accesses the at least one of the specified DRAM chip 260 based on the address included in the memory access. The access control for the DRAM chip 260 may be performed using a known technique, the explanation thereof is omitted.

In a case where it is determined that the access target is not in the DRAM-mounted area 350, meaning that the access target is in the flash memory-mounted area 360, the embedded DIMM 130 accesses at least one flash memory chip via the flash memory bus 281, responds the result of the access to the processor 110, and terminates the processing (Step S905). For example, the following processing may be performed.

In a case where the memory access is a request to write data to the flash memory-mounted area 360, the intelligent control unit 223 in the control unit 220 writes the data to a buffer inside the controller 200 and responds termination of the write to the processor 110. Thereafter, the intelligent control unit 223 issues a write command to the flash memory chip interface 240 so as to write the data written to the buffer. The flash memory chip interface 240 locates the at least one flash memory chip 280 based on this command and writes data stored in the buffer to the at least one flash memory chip 280.

In a case where the memory access is a request to read data from the flash memory-mounted area 360, the intelligent control unit 223 in the control unit 220 issues a data read command to the flash memory chip interface 240. The flash memory chip interface 240 identifies the at least one flash memory chip 280 based on this command and reads data stored in the identified flash memory chip 280. The intelligent control unit 223 stores the read data to the buffer, and responds the data stored in the buffer to the processor 110 in a case where the read data stored the buffer has a specified data size.

This embodiment is based on the assumption that the unit for data write and the unit for data read are a page. However, this invention is not limited to this.

Described above is an example of the processing at Step S905.

At Step S902, in a case where it is determined that the memory access is not a normal memory access, the embedded DIMM 130 determines whether the received memory access is the first special memory access (Step S906).

In a case where it is determined that the memory access is the first special memory access, the embedded DIMM 130 expands the compressed data stored in the flash memory compression area (Step S907), and writes the expanded data to the flash memory use area (Step S908). Thereafter, the embedded DIMM 130 terminates the processing.

For example, the following processing may be performed at Steps S907 and S908.

The control unit 220 issues a read command to the flash memory chip interface 240 so as to read the compressed data stored in the specified flash memory compression area based on the first special memory access. The flash memory chip interface 240 identifies the at least one flash memory chip 280 corresponding to the flash memory compression area based on this command and reads the compressed data from the at least one of the identified flash memory chip 280.

The control unit 220 stores the read compressed data to the buffer and the compression/expansion unit 222 in the control unit 222 expands the compressed data stored in the buffer and stores the expanded data to the buffer.

The control unit 220 issues a write command to the flash memory chip interface 240 so as to write the expanded data based on the first special memory access. The flash memory chip interface 240 identifies the at least one flash memory chip 280 corresponding to the flash memory use area based on this command and writes the expanded data to the at least one of the identified flash memory chip 280.

This embodiment is based on the assumption that the control unit 220 reads compressed data from the flash memory compression area on a page-by-page basis and expands the compressed data on the page-by-page basis. However, this invention is not limited to this.

Described above is an example of the processing at Steps S907 and S908.

At Step S906, In a case where it is determined that the received memory access is not the first special memory access, meaning that the received memory access is the second special memory access, the embedded DIMM 130 compresses the data stored in the specified flash memory use area (Step S909) and writes the compressed data to the flash memory compression area (Step S910). Thereafter, the embedded DIMM 130 terminates the processing.

For example, the following processing may be performed at Steps S909 and S910.

The control unit 220 issues a read command to the flash memory chip interface 240 so as to read the data stored in the specified flash memory use area based on the second special memory access. The flash memory chip interface 240 identifies the at least one flash memory chip 280 corresponding to the flash memory use area based on this command and reads the data from the at least one of the identified flash memory chip 280.

The control unit 220 stores the read data to the buffer; the compression/expansion unit 222 in the control unit 222 compresses the data stored in the buffer and stores the compressed data to the buffer. It should be noted that this invention is not limited in the data compression method.

The control unit 220 issues a write command to the flash memory chip interface 240 so as to write the compressed data based on the second special memory access. The flash memory chip interface 240 identifies the at least one flash memory chip 280 corresponding to the flash memory compression area based on this command and writes the compressed data to the at least one of the identified flash memory chip 280.

This embodiment is based on the assumption that the control unit 220 reads data from the flash memory use area on a page-by-page basis and compresses the data on the page-by-page basis. However, this invention is not limited to this.

Figure 10:
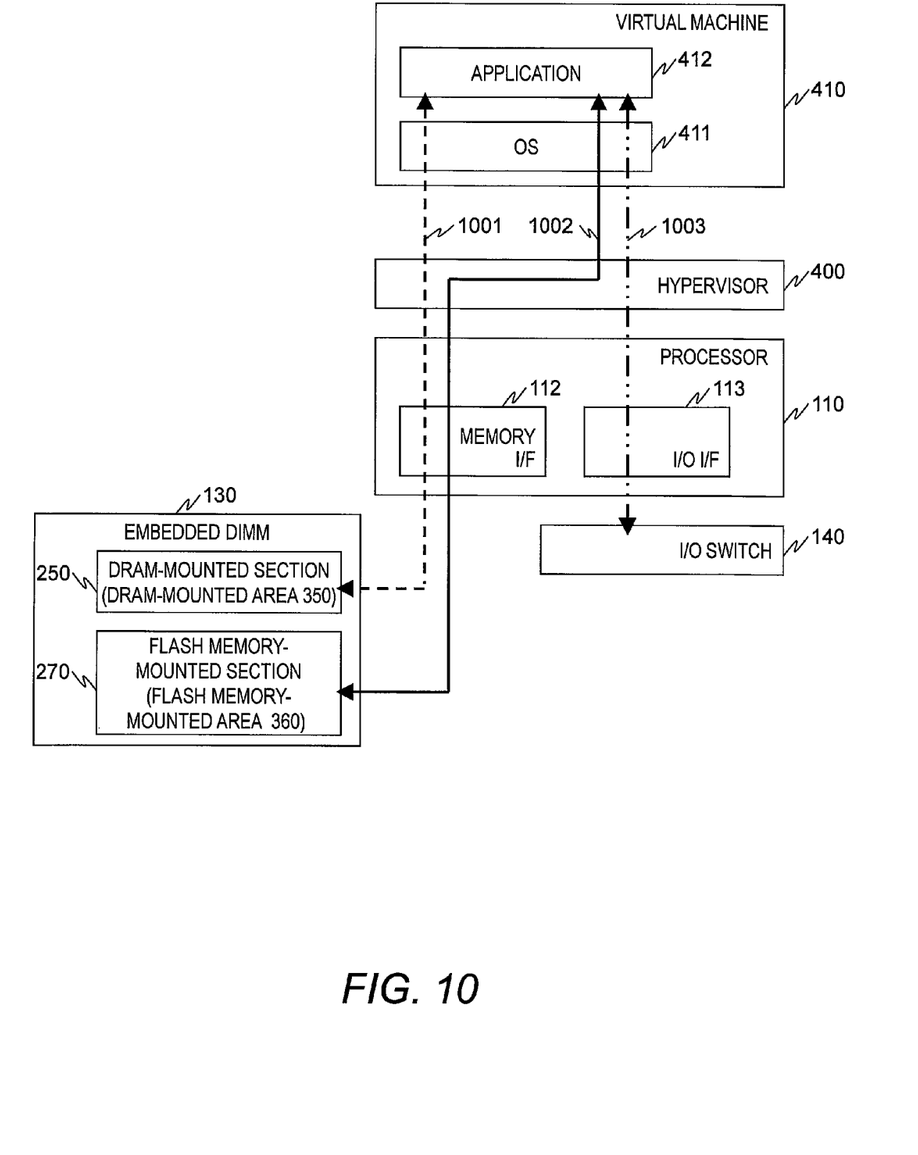
FIG. 10 is a stack diagram illustrating the memory access and an I/O access according to this embodiment.

FIG. 10 is a stack diagram illustrating the memory access and the I/O access according to this embodiment.

The routes of the memory access and the I/O access in this embodiment are as shown in FIG. 10.

The route 1001 of the memory access between the OS 411 and the DRAM-mounted area 350 is the same as the traditional one, which is, when the application 412 requests an access to the memory, the memory interface 112 is activated through the OS 411 and the hypervisor 400 and the DRAM-mounted section 250 in the embedded DIMM 130 is accessed.

The route 1003 of the I/O access between the OS 411 and an I/O device is the same as the traditional one, which is, when the application 412 requests an access to an I/O device, the I/O interface 113 is activated through the OS 411 and the hypervisor 400 and the I/O device such as the NIC 150 is operated through the I/O switch 140.

This embodiment is featured by the route 1002.

As shown in FIG. 5, the OS 411 recognizes the flash memory-mounted area 360 as the high-speed I/O device-mounted area 530. Accordingly, to access the high-speed I/O device-mounted area 530, the application 412 outputs an access to the I/O space 520. This access is received by the hypervisor 400 via the OS 411.

The hypervisor 400 translates this access into an access to the memory space 310 so that the memory interface 112 is activated and the flash memory-mounted section 270 in the embedded DIMM 130 is accessed.

In this invention, the embedded DIMM 130 including flash memories allows the working set to be resident in the memory area which can be accessed at high speed. Furthermore, the hypervisor 400 provides the storage area of the flash memories for the I/O space, concealing the particular hardware configuration. This approach has the following effects.

The embedded DIMM 130 can store all data in the working set because the embedded DIMM 130 includes flash memories. Accordingly, there is no need to add a large memory, achieving low cost and low power consumption in the computer system.

For the access between the main memory and the storage device, the bandwidth of the Fibre channel is a bottle neck in the invention disclosed in JP 2008-27383 A and the transfer rate of the PCIe bus is a bottle neck in the invention disclosed in U.S. 2010/0252931 A. This invention, however, uses a high-speed memory interface to access flash memories, achieving high processing performance in the computer system.

This invention enables use of the embedded DIMM 130 without modification of the existing OS or applications.

As to the storage area of the flash memories, data is compressed or expanded depending on the state of accesses to the data to secure the memory area for allowing the working to be resident. This configuration prevents the processing performance of the computer system from degrading. Furthermore, such effective use of the storage area of the flash memories does not require unnecessary addition of a DIMM and others.

Additionally, since the working set in the flash memories can store all data, occurrence of a page fault can be minimized. Consequently, the overall computer system achieves low power consumption. Furthermore, there is no need of an external storage for swapping the data which cannot be stored in the working set, so that the computer system can be small in scale. Accordingly, a low cost and low power consuming computer system can be attained.

The flash memory use area and the flash memory compression area are included in the same embedded DIMM 130; accordingly, the processor 110 that executes processing for the hypervisor 400 outputs a single memory access to operate the storage space of a virtual machine 410. This configuration achieves low processing load to the processor 110, so that the power consumption in the computer 100 can be saved.

The memory access using the memory interface achieves high processing performance of the computer system, leading to low latency in reading or writing data. This allows effective use of the computer resources allocated to a virtual machine, so that the power consumption in the overall computer system can be saved.

As set forth above, this invention has been described in detail with reference to the accompanying drawings, but this invention is not limited to these specific configurations and includes various modifications or equivalent configurations within the scope of the appended claims.

What is claimed is:

1. A computer comprising:
   a processor;
   a memory coupled to the processor; and
   an I/O device coupled to the processor,
   the memory including at least one first memory element and at least one second memory element different from the at least one first memory element in characteristics thereof,
   wherein a memory area provided by the at least one second memory element includes a data storage area and a data compression area,
   wherein the computer further comprises a virtualization management unit for managing at least one virtual machine that is allocated computer resources of the computer, and
   wherein the virtualization management unit is configured to:
   set a working set for storing data required for processing performed by a virtual machine in generating the virtual machine, and
   control data stored in the working set in such a manner that at least a part of the data stored in the working set is stored in the data compression area based on a state of accesses to the data stored in the working set,
   wherein the at least one first memory element is a volatile memory element and the at least one second memory element is a non-volatile memory element,
   wherein the memory includes a controller for controlling memory accesses received from the processor which executes the virtualization management unit,
   wherein the virtualization management unit is further configured to:
   monitor usage of the data storage area;
   select data having an oldest access time or data having a lowest access frequency from the data stored in the working set, in a case where the usage of the data storage area is larger than a predetermined threshold; and
   output a memory access requesting to write the selected data to the data compression area, and
   wherein the controller is configured to:
   read the selected data from the data storage area based on the memory access;
   compress the selected data; and
   write the compressed data to the data compression area as compressed data.

2. A computer according to claim 1,
   wherein the virtualization management unit is further configured to:
   select the compressed data to be read from the data compression area, in a case where free space of the data storage area is larger than a predetermined threshold; and
   output a memory access requesting to read the selected compressed data to the data storage area, and
   wherein the controller is further configured to:
   read the selected compressed data from the data compression area based on the memory access;
   expand the selected compressed data; and
   write the expanded data to the data storage area.

3. A computer according to claim 2,
   wherein an operating system operates on the virtual machine, and
   wherein the virtualization management unit is further configured to:
   allocate the at least one second memory element to a virtual storage device;
   generate translation information to translate an I/O access to the virtual storage device into a memory access to the at least one second memory element;
   translate an I/O access to the virtual storage device into a memory access to the at least one second memory element based on conversion information, in a case of receiving the I/O access to the virtual storage device from the operating system; and
   output the translated memory access to the memory.

4. A memory management method in a computer,
   the computer including a processor, a memory coupled to the processor, an I/O device coupled to the processor, and a virtualization management unit for managing at least one virtual machine that is allocated computer resources of the computer,
   the memory including at least one first memory element and at least one second memory element different from the first memory element in characteristics thereof,
   a memory area provided by the at least one second memory element including a data storage area and a data compression area,
   the memory management method comprising:
   a first step of setting, by the virtualization management unit, a working set for storing data required for processing performed by the virtual machine in generating the virtual machine; and
   a second step of controlling, by the virtualization management unit, data stored in the working set in such a manner that at least a part of the data stored in the working set is stored in the data compression area based on a state of accesses to the data stored in the working set,
   wherein the at least one first memory element is a volatile memory element and the at least one second memory element is a non-volatile memory element,
   wherein the memory includes a controller for controlling memory accesses received from the processor which executes the virtualization management unit, and
   wherein the second step further comprises:
   a step of monitoring, by the virtualization management unit, usage of the data storage area;
   a step of selecting, by the virtualization management unit, data having an oldest access time or data having a lowest access frequency from the data stored in the working set in a case where the usage of the data storage area is larger than a predetermined threshold;
   a step of outputting, by the virtualization management unit, a memory access requesting to write the selected data to the data compression area;
   a step of reading, by the controller, the selected data from the data storage area based on the memory access;
   a step of compressing, by the controller, the selected data; and
   a step of writing, by the controller, the compressed data to the data compression area as compressed data.

5. A memory management method according to claim 4, further comprising:
   a step of selecting, by the virtualization management unit, compressed data to be read from the data compression area in a case where free space of the data storage area is larger than a predetermined threshold;
   a step of outputting, by the virtualization management unit, a memory access requesting to read the selected compressed data to the data storage area;
   a step of reading, by the controller, the selected compressed data from the data compression area based on the memory access;

a step of expanding, by the controller, the selected compressed data; and a step of writing, by the controller, the expanded data to the data storage area.

6. A memory management method according to claim 5, wherein an operating system operates on the virtual machine, and wherein the first step further comprises:

a step of allocating the at least one second memory element to a virtual storage device;

a step of generating translation information to translate an I/O access to the virtual storage device into a memory access to the at least one second memory element;

a step of translating, upon receipt of an I/O access to the virtual storage device from the operating system, the I/O access to a memory access to the at least one second memory element based on conversion information; and a step of outputting the translated memory access to the memory.

* * * * *